United States Patent
Horwinski

[11] 3,847,392
[45] Nov. 12, 1974

[54] ADJUSTABLE DROP OR RISER NIPPLE

[75] Inventor: Elwood R. Horwinski, Cheshire, Conn.

[73] Assignee: CV Industries, Inc., Jacksonville, Fla.

[22] Filed: Nov. 8, 1972

[21] Appl. No.: 304,845

[52] U.S. Cl.................. 285/302, 239/209, 285/338
[51] Int. Cl........................ A62c 37/08, A16l 15/02
[58] Field of Search ............ 239/209, 203; 285/338, 285/302, 346, 196; 403/227, 104, 109

[56] References Cited
UNITED STATES PATENTS

| | | | |
|---|---|---|---|
| 402,600 | 5/1889 | Kemp............................. | 285/338 X |
| 1,334,007 | 3/1920 | White............................. | 285/95 X |
| 2,521,127 | 9/1950 | Price............................. | 285/302 X |
| 2,683,499 | 7/1954 | DeCroes......................... | 285/338 X |
| 2,721,089 | 10/1955 | Shames......................... | 285/338 X |
| 3,083,914 | 4/1963 | Smith et al..................... | 239/203 |
| 3,084,869 | 4/1963 | Hutty et al..................... | 285/302 X |
| 3,194,316 | 7/1965 | Faulkner et al................. | 239/209 X |
| 3,421,782 | 1/1969 | Kalish et al.................... | 285/338 X |
| 3,451,483 | 6/1969 | Van Houtte et al............. | 285/302 X |

FOREIGN PATENTS OR APPLICATIONS

| | | | |
|---|---|---|---|
| 1,008,020 | 2/1952 | France............................ | 285/338 |

Primary Examiner—Thomas F. Callaghan
Attorney, Agent, or Firm—George H. Baldwin; Arthur G. Yeager

[57] ABSTRACT

An adjustable drop or riser nipple for sprinkler systems and the like, comprising short, telescoping inner and outer lengths of pipe having interposed between them a locking sleeve which acts against an expansible, resilient sealing ring so as to lock the telescoping pipes in any of various adjusted positions and also seal the same to each other. The locking sleeve has an exposed end which is acted on by an operable nut threaded onto a juxtaposed end of the inner one of the lengths of pipe. The inner pipe at its other or inner end has fixedly attached to it an annular abutment shoulder which engages one end of the resilient sealing ring. The other end of the sealing ring is engaged by the locking sleeve in such a manner that when the sleeve is forcibly axially shifted by the act of tightening the operable nut, it causes radial expansion or deformation of the sealing ring, resulting in the latter tightly gripping both the inner and outer pipes to not only lock these in any adjusted position but also to seal the same tightly to each other and prevent leakage of liquid. An exposed end of the outer pipe has an inwardly extended locking bead or shoulder of smaller diameter than the abutment shoulder on the inner pipe, whereby the latter is held captive and cannot inadvertently drop from or be removed from the outer pipe. The exposed end of the inner pipe mounts the usual sprinkler head and heat-responsive valve normally provided on automatic fire-extinguishing sprinkler systems. The telescopic arrangement enables adjustment of the nipple assemblage for length, so that it can be readily used where false or acoustic ceilings are being installed in existing factory or industrial structures. The adjustment and tightening of the nipple is readily effected from a location below the installed false or acoustic ceiling.

4 Claims, 5 Drawing Figures

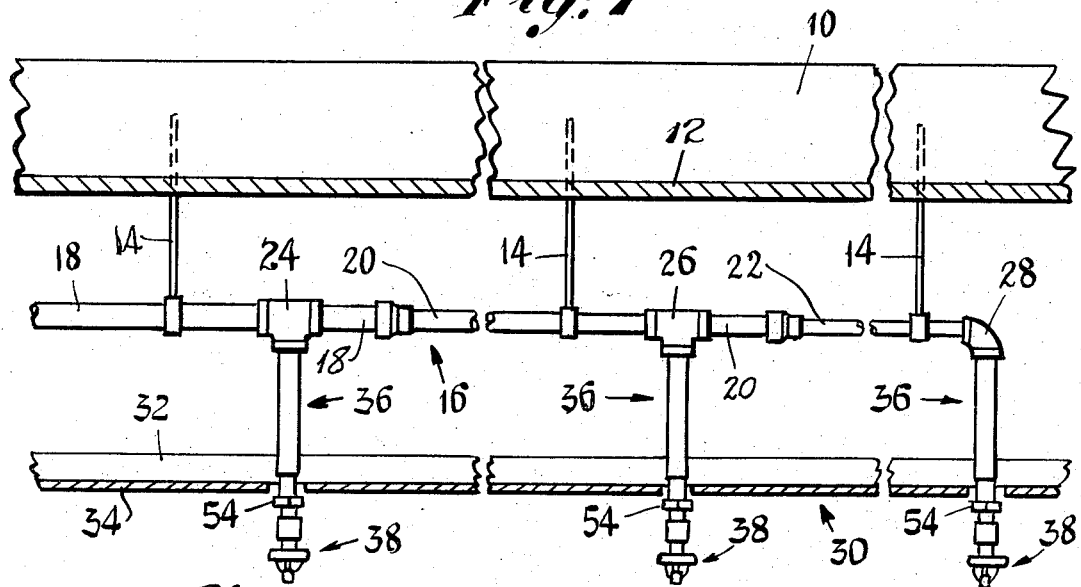
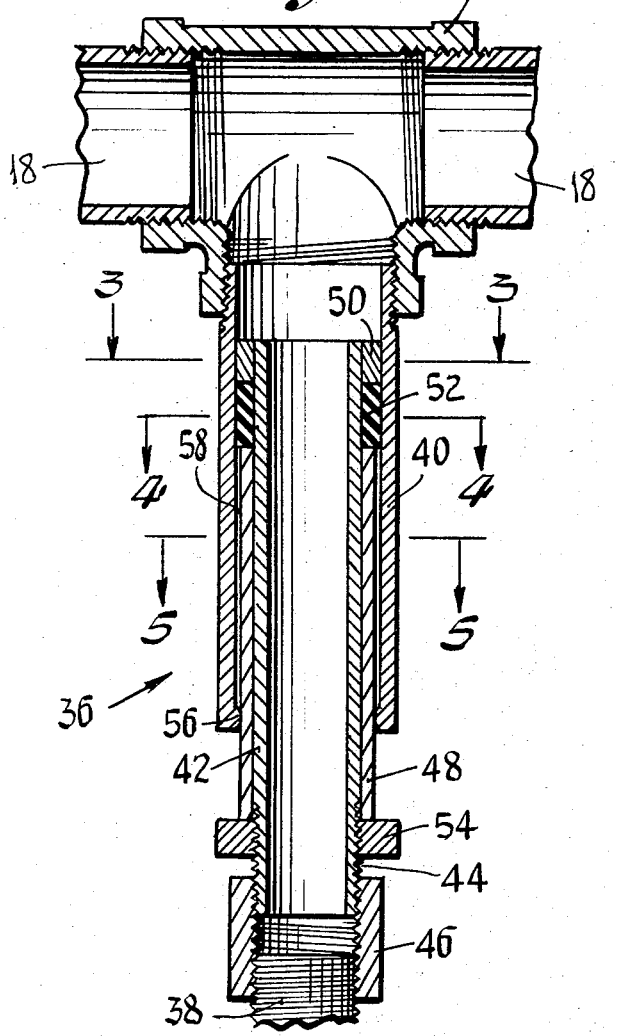
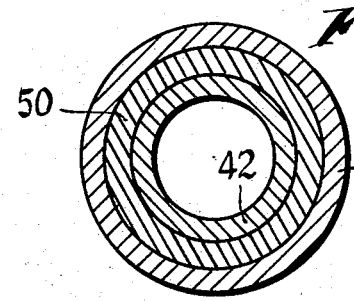
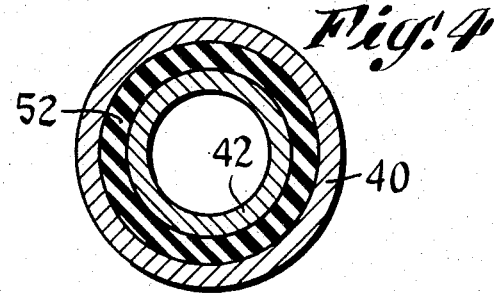
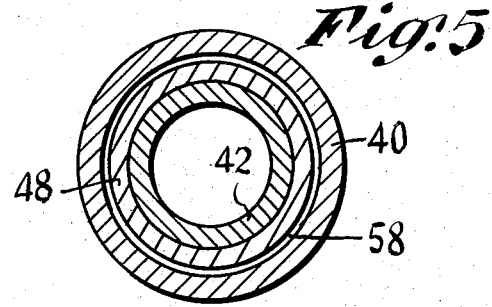

ADJUSTABLE DROP OR RISER NIPPLE

BACKGROUND

This invention relates to extensible and retractable pipe joints or connections, and more particularly to adjustable pipe or nipple structures such as drop nipples for automatic fire-extinguishing sprinkler systems, riser nipples for lawn sprinklers and the like. Heretofore various types of telescopic, adjustable pipe joints or assemblies have been proposed and produced, intended for uses such as with lawn sprinklers, automatic overhead fire extinguishing sprinkler systems, etc. In general, these prior devices were intended for a specific initial construction, as part of an original structure or lay-out of job. In such cases the required sizes and dimensions were completely predetermined, and the components of the adjustable joint were therefore pre-cut according to the specifications of the particular job. In the case of lawn sprinklers, the adjustable riser nipple would be installed before backfilling, and the adjustment then readily effected according to the level of the land. Thus, adjustment normally presented no problem.

In the case of remodeling of building structures employing automatic sprinkler systems, however, the installation of a false or acoustic ceiling made it necessary to cut and install longer drop nipples for the sprinkler heads. This was a tedious and time-consuming job, and represented a costly part of the work or installation. Efforts have been made to reduce the time and work involved, by the use of extensible pipe joints, but these were not satisfactory because of the possibility of leakage, and because the adjustment member was located above the false or acoustic ceiling, between the latter and the original ceiling. This was at times inconvenient and not practical, since while it solved one problem it resulted in the creation or other problems.

Extensible or telescopic pipe joints for other purposes have also been proposed and produced, but these devices were not suitable for acoustic ceiling installations for the reason that the nipple element which carried the sprinkler head was not positively secured or held captive, nor could the adjustment of the nipple be readily effected from below the newly installed ceiling and re-adjustment made at any later time without disrupting the installed structures.

SUMMARY

The above disadvantages and drawbacks of prior extensible nipples or pipe joints are obviated by the present invention, which has for its main object the provision of a novel and improved drop nipple for automatic fire extinguising sprinkler systems wherein adjustment of the nipple can be readily effected from a location below newly installed ceilings, and wherein the sprinkler-head-carrying portion of the nipple is positively held captive and prevented from being inadvertently separated from the cooperable supporting pipe element. A related object of the invention is to provide an improved adjustable or extensible drop nipple as above characterized, which is especially simple in its construction, having relatively few parts whereby the fabrication and assembly cost is held to an absolute minimum. The above objects are accomplished by a novel nipple structure comprising short, outer and inner telescoping lengths of pipe between which there is interposed a locking sleeve. The inner pipe at its inner end has a fixed annular abutment or shoulder, and also carries an expansible resilient sealing ring. The locking sleeve engages one end of the sealing ring whereas the other end is engaged by the shoulder of the inner pipe. The locking sleeve has a projecting end which is engageable by an operable nut carried on threads provided on the inner pipe. By such arrangement, tightening of the nut will shift the locking sleeve so as to compress the expansible resilient sealing ring, causing the latter to forcibly engage both the inner and outer telescopic pipes, resulting in a fluid-tight seal therebetween as well as effecting a locking action to secure the pipes in adjusted position. The outer pipe at its lower end has an inturned locking bead or shoulder with a smaller diameter than the annular shoulder of the inner pipe whereby the latter is held captive and cannot be inadvertently dropped or slipped out of the outer pipe so as to be separated therefrom. The exposed end of the inner pipe can have threaded onto it a coupling adapted to receive a sprinkler head or other orifice-type device, as desired.

Other features and advantages of the invention will hereinafter appear.

In the accompanying drawings:

FIG. 1 is a diagrammatic representation of a portion of a building structure illustrating an original ceiling and a drop or false ceiling which is usually formed with acoustic tile, and illustrating further the incorporation of extensible drop nipples of the type provided by the invention.

FIG. 2 is an axial sectional view of a drop nipple and portion of the sprinkler system, illustrating various structural details.

FIG. 3 is a transverse section taken on the line 3—3 of FIG. 2.

FIG. 4 is a transverse section taken on the line 4—4 of FIG. 2, and

FIG. 5 is a transverse section taken on the line 5—5 of FIG. 2.

Considering first FIG. 1 there is illustrated an existing building structure comprising ceiling joists 10 supporting an original ceiling 12. Carried by the ceiling 10, 12 are existing hangers 14 for a sprinkler system which comprises a distribution pipe 16 having sections or lengths 18, 20 and 22 of graduated or consecutively smaller diameters. The pipe sections 18, 20 and 22 are connected by reducer T's 24 and 26, and at the end of the pipe length 22 there is an elbow 28. Below the distribution pipe 16 of the sprinkler system there is a sub-ceiling or dropped ceiling 30 comprising a usual type of supporting framework 32 to the underside of which are attached acoustic ceiling panels 34.

In accordance with the present invention, novel drop nipples 36 are provided, attached to the T-fittings 24, 26 and to the elbow 28, such drop nipples being provided at their bottom ends with conventional sprinkler heads 38. Considering now FIGS. 2–5, there is illustrated one such drop nipple 36, comprising short, outer and inner lengths of pipe 40, 42, the outer pipe at its upper or top end being threaded into the T-fitting 24. The lower or bottom end portion the inner pipe 42 is threaded, having external screw threads 44 on which there is mounted a coupling 46 carrying the automatic valve and sprinkler head 38.

In accordance with the invention, interposed between the outer and inner lengths of pipe 40, 42 there is a locking sleeve 48 which closely, slidably fits the pipes. Also, the upper end of the inner pipe 42 has rigidly secured thereto an annular abutment or shoulder 50 adapted to slide along the inner surface of the outer pipe 40. Carried by the inner pipe 42 is an expansible resilient sealing ring 52 one end of which engages the shoulder 50 and the other end of which is engaged by the top end of the locking sleeve 48. The sleeve 48 at its bottom end projects from the outer pipe 40, and is engaged by an operable nut 54 which is carried by the external threads 44 of the inner pipe 42. Further, in accordance with the invention, the bottom end of the outer pipe 40 is provided with an inturned locking bead or shoulder 56 adapted to slidably engage the exterior of the locking sleeve 48 and having an internal diameter which is somewhat smaller than the outer diameter of the annular shoulder 50 rigidly carried by the inner pipe 42, A slight clearance space 58 can be provided between the inside wall of the outer pipe 40 and the exterior of the locking sleeve 48 whereby the exterior diameter of the sleeve 48 is slightly less than the exterior diameter of the shoulder 50. By such organization, it is possible to adjust the nipple 36 for length by sliding the inner pipe 42 and the locking sleeve 48 either upward or downward, due to the sliding fits provided. When the desired length of the nipple is attained, the nut 54 is tightened whereupon the locking sleeve 48 will be forced against the sealing ring 52 and will compress the latter, forcing the same radially against both the outer pipe 40 and the inner pipe 42. As a consequence, the two lengths of pipe 40, 42 will be securely locked in their adjusted positions against accidental shifting movement, and also will be securely sealed to each other to prevent any leakage of fluid or liquid therebetween.

Referring to FIG. 1 it will be seen that the locking nuts 54 are located below the dropped false or acoustic ceiling 30 whereby these are readily accessible for loosening and tightening. Accordingly, the nipples 36 can be adjusted for proper length even though the acoustic ceiling 30 is already in place, since the adjustment involves operation of the exposed nuts 54 and shifting of the inner pipe length 42, the latter by applying force to the sprinkler heads 38. When the desired adjustment is effected it merely becomes necessary to again tighten the nut 54 in order to lock and seal the nipple in the desired position.

By the provision of the locking bead or shoulder 52 on the outer length of pipe 40 there is positively prevented any dropping out or removal of the inner pipe 42 from the nipple, and this constitutes an important safety feature of the invention.

It will now be seen from the foregoing that I have provided a novel and improved retractable and extensible drop nipple for automatic fire extinguishing sprinkler systems, lawn sprinkler systems and the like, wherein relatively few parts are involved, wherein adjustment of the nipple can be readily effected from a location adjacent the sprinkler head, and wherein the fabrication cost and assembly of the components can be quickly and readily effected, the cost being held to an especially low figure.

Variations and modifications are possible without departing from the spirit of the invention.

I claim:

1. An extensible and retractable nipple for a building fire protection system to connect a sprinkler head assembly at the underside of a dropped ceiling to a water supply pipe in which water is to be maintained under continuous pressure, said nipple comprising a telescoping inner length and outer length of pipe adapted to depend from such supply pipe, said inner pipe having an exteriorly threaded lower end portion extending from the lower end of said outer pipe and being adapted to threadedly support a sprinkler head assembly having internal threads on its said lower end portion, said inner pipe being movable axially of said outer pipe to permit positioning of such attached sprinkler head assembly in selected positions relative to the distance below such supply pipe of the underside of the dropped ceiling, the upper end portion of said inner pipe being disposed within said outer pipe, the upper end portion of said outer pipe being adapted for connection to the water supply pipe, an elongated locking sleeve telescopingly interposed between said pipes, said sleeve having a lower end at said lower end portion of said inner pipe and an upper end disposed within said outer pipe, said inner pipe upper end including an outward shoulder affixed thereto adjacently above said upper end of said sleeve, a resilient sealing ring disposed between said pipes and in the space between said shoulder and said upper end of said sleeve, nut means threadedly engaged on said threaded lower end portion of said inner pipe above such sprinkler head assembly for moving said locking sleeve axially upwardly to squeeze said ring between said upper end of said sleeve and said shoulder thereby to expand said ring against said pipes to lock said inner pipe against movement with respect to said outer pipe and effect a seal therebetween, said nut means being located on said lower end portion of said inner pipe adjacent such sprinkler head assembly where it is accessible for adjustment below such dropped ceiling when said inner pipe is extended from said outer pipe.

2. The combination according to claim 1 wherein said outer pipe is provided at its said lower end portion with internal stop means cooperative with said ring and shoulder to maintain said inner pipe captive against downward removal from said outer pipe.

3. The combination according to claim 1 wherein the inner wall of said outer pipe is cylindrical.

4. The combination according to claim 2 wherein the inner wall of said outer pipe is cylindrical.

* * * * *